(12) United States Patent
Roberts

(10) Patent No.: US 6,915,348 B1
(45) Date of Patent: Jul. 5, 2005

(54) VALIDATION OF A CONNECTION BETWEEN ARBITRARY END-POINTS IN A COMMUNICATIONS NETWORK USING AN AUGMENTED SPE

(75) Inventor: Kim B. Roberts, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 891 days.

(21) Appl. No.: 09/662,337

(22) Filed: Sep. 14, 2000

(51) Int. Cl.[7] .............................................. G06F 15/16
(52) U.S. Cl. ....................... 709/236; 709/228; 709/224
(58) Field of Search ................................ 709/201–253

(56) References Cited

U.S. PATENT DOCUMENTS

| | | | | |
|---|---|---|---|---|
| 5,655,068 A | * | 8/1997 | Opoczynski ................... 714/4 |
| 5,704,036 A | * | 12/1997 | Brownmiller et al. ........ 714/43 |
| 5,732,213 A | * | 3/1998 | Gessel et al. ............... 709/224 |
| 5,793,976 A | * | 8/1998 | Chen et al. ................. 709/224 |
| 5,838,919 A | | 11/1998 | Schwaller et al. ..... 395/200.54 |
| 6,072,777 A | * | 6/2000 | Bencheck et al. .......... 370/244 |
| 6,505,249 B1 | * | 1/2003 | Rehkopf ..................... 709/224 |

* cited by examiner

Primary Examiner—Jack B. Harvey
Assistant Examiner—Scott M. Collins
(74) Attorney, Agent, or Firm—Ogilvy Renault

(57) ABSTRACT

An OP-N connection is mapped through a communications network between first and second end-nodes via at least one intermediate node. The integrity and validity of the OP-N connection can be determined independently of SONET/SDH lines, sections or paths mapped through the network, and potentially utilizing bandwidth of the OP-N connection. Validation of the OP-N connection can be accomplished by inserting performance monitor (PM) information into a data signal at the first end-node. The PM information is inserted into the synchronous payload envelope (SPE) of a SONET/SDH data signal. At each intermediate node between the first and second end-nodes, the PM information may be extracted, examined and/or augmented or simply pointer processed before the data signal is forwarded. At the second end-point, the PM information is extracted and examined. Multiple levels of OP-N connections are supported, with each level being provided with a respective set of PM information carried in the SPE.

81 Claims, 6 Drawing Sheets

VALIDATION OF A CONNECTION BETWEEN ARBITRARY END-POINTS IN A COMMUNICATIONS NETWORK USING AN AUGMENTED SPE

CROSS-REFERENCE TO RELATED APPLICATIONS

This is the first application filed for the present invention.

MICROFICHE APPENDIX

Not Applicable.

TECHNICAL FIELD

This invention relates to communications networks, and in particular to a method for validating connections established between arbitrary end-points in a communications network.

BACKGROUND OF THE INVENTION

Within the modern network space, the Synchronous Optical Network (SONET) protocol (and its European equivalent, the Synchronous Digital Hierarchy (SDH)) protocol is a popular mechanism for data transport. Under the SONET/SDH protocol, connections through the network core, and between end-user communications devices, are constructed using a layered model. Each layer (or level) uses connections established at lower levels to build connections spanning progressively larger portions of the network. Within the network core, Section and Line-level connections are established. Section-level connections (commonly referred to as sections) are set-up between topologically adjacent nodes (which may be, for example, cross-connects, regenerators or Add-Drop-Multiplexors) of the network, and correspond to individual hops of an end-to-end connection. Line-level connections (commonly referred to as lines) are set-up between nodes capable of processing line overhead within data signals (e.g. cross-connects or Add-Drop-Multiplexors). Regenerators are usually capable of terminating only sections, whereas cross-connects and Add-Drop-Multiplexors will normally terminate both sections and lines. Lines typically span one or more sections.

An end-to-end connection between nodes at which a data signal is multiplexed and demultiplexed is a path-level connection (usually referred to as a Path). A path commonly spans multiple lines, and may extend beyond the network core to terminate at suitable end-user communications equipment (such as concentrator access switches or service provider routers).

The SONET/SDH protocol provides conventional methods for validating sections, lines and paths. These include section trace, section parity, and line parity checks which implement integrity and validation within one section or one SONET/SDH line. Telecordia TR-253 describes a Path Trace implementation, which enables an end-to-end validation of a path. Path parity implements a path level integrity check. Tandem connection monitoring implements additional integrity checks within the path level. These path-level integrity checks utilize validation, parity and fault indication data that are inserted into Synchronous Payload Envelopes (SPEs) of signals being transported through the path, typically embedded within the path overhead (POH).

Co-pending and co-assigned U.S. patent application Ser. No. 09/539,707 filed on Mar. 31, 2000, and entitled METHOD AND SYSTEM FOR ESTABLISHING CONTENT-FLEXIBLE CONNECTIONS IN A COMMUNICATIONS NETWORK teaches a technique for establishing an open connection (OP-N), mapped across a communications network. The OP-N connection is "concatenatable", in that an end user can transport arbitrarily concatenated signal traffic through the OP-N connection. In principle, virtually any combination of concatenated and non-concatenated signals may be used, up to the bandwidth capacity of the OP-N connection. The traffic mixture (i.e., the mix of concatenated and non-concatenated traffic) within the OP-N connection can be selected by the end user to satisfy their requirements, and may be changed by the end user as those requirements change, without requiring re-configuration of the OP-N connection.

The OP-N connection described in the above-referenced co-pending patent application is constructed using a layered model, in a manner analogous to conventional SONET/SDH connections. The layers of an OP-N connection are designed to fit between the SONET/SDH Line and Path layers. In general, an OP-N connection is expected to span multiple lines, and yet be shorter than an end-to-end path. An OP-N connection may carry multiple paths and will be set up and validated prior to the establishment of any paths through it. It is therefore necessary to implement a technique for validating OP-N connections independently of any Path-level connections.

Co-pending and co-assigned U.S. patent application Ser. No. 09/597,974, filed on Jun. 20, 2000 and entitled VALIDATION OF A CONNECTION BETWEEN ARBITRARY END-NODES IN A COMMUNICATIONS NETWORK teaches a technique for validating OP-N connections independently of any Path-level connections. Validation of the OP-N connection is accomplished by inserting performance monitor (PM) information into an unused portion of the transport overhead (TOH) of a SONET/SDH data signal at a transmitting end-node of the OP-N connection. At the receiving end-node of the OP-N connection, the PM information is extracted and examined. At each intermediate node between the transmitting and receiving end-nodes, the PM information is extracted from the data signal, buffered while the data signal is pointer processed, and then reinserted before forwarding the data signal. Multiple levels of OP-N connections can be independently validated in this manner, by providing each level with respective PM information.

A disadvantage of this method is the need for extracting, buffering, and reinserting the PM information at intermediate nodes between the transmitting and receiving end-nodes of the OP-N connection. Such complex processing requires specialized hardware and/or software within each node, which significantly increases costs.

Accordingly, a cost-effective method and apparatus for validating an OP-N connection mapped through a communications network between arbitrary end-points remains highly desirable.

SUMMARY OF THE INVENTION

An object of the present invention is to provide a method and apparatus for ensuring the integrity and validity of a connection mapped through a communications network between arbitrary end-points.

Another object of the present invention is to provide a method and apparatus for ensuring the integrity and validity of a connection mapped through a communications network between arbitrary end-points, in which the connection is topologically longer than one SONET/SDH line or section, and shorter than a SONET/SDH path.

A further object of the present invention is to provide a method and apparatus for ensuring the integrity and validity of multiple layers of connections that are topologically longer than one SONET/SDH line or section, and shorter than a SONET/SDH path.

Accordingly, an aspect of the present invention provides method of validating a connection mapped through a communications network between first and second end-nodes. At the first end-node, performance monitor (PM) information is inserted into a predetermined location within a payload envelope of a synchronous container. The synchronous container is transmitted through the connection to the second end-node. At the second end-node, the PM information is extracted from the synchronous container.

A further aspect of the present invention provides a system of validating a connection mapped through a communications network between first and second end-nodes. The system comprises: means for inserting performance monitor (PM) information into a predetermined location within a payload envelope of the synchronous container at the first end-node; means for transmitting the synchronous container through the connection to the second end-node; and means for extracting the PM information from the synchronous container at the second end-node.

Another aspect of the present invention provides an apparatus for validating a connection mapped through a communications network between first and second end-nodes. The apparatus comprises: means for inserting performance monitor (PM) information into a predetermined location within a payload envelope of a synchronous container; and means for transmitting the synchronous container through the connection.

Another aspect of the present invention provides an apparatus for validating a connection mapped through a communications network between first and second end-nodes. The apparatus comprising: means for receiving a synchronous container through the connection; and means for extracting performance monitor (PM) information from a predetermined location within a payload envelope of the synchronous container.

The synchronous container is preferably an augmented synchronous payload envelope (SPE) having a payload capacity that is sufficient to accommodate the PM information. In such cases, the first and second nodes are preferably enabled to pointer process the augmented SPE. This may be accomplished by providing an extended range of valid payload pointer values that can be pointer processed within each node participating in the connection.

In some embodiments, each node in the network is adapted to support a plurality of connection layers and the connection is mapped on one of the plurality of connection layers. In such cases, PM information respecting each layer is inserted into a respective predetermined location of the synchronous container.

The PM information may include any one or more of a Trace field; a Parity field; and an indicator field.

The Trace field may include a nibble of a trace message for communicating information concerning the connection. Successive nibbles of the trace message may be inserted into respective successive synchronous containers until an entire trace message has been sent. The trace message may be repeated after the entire trace message has been sent.

The parity field may contain a parity value calculated in respect of an outgoing synchronous container. The calculated parity value is inserted into the parity field of the next outgoing synchronous container. The parity value may be a BIP-8, and may be calculated starting after an H2 byte of a transported overhead (TOH) portion of the signal, and incorporating all SPE bytes until the H2 byte of a next data signal.

The indicator field may contain an error count accumulated in respect of the data signal. The error count may be a BIP-8.

In some embodiments, the step of extracting the PM information comprises a step of extracting one or more of a trace field; a parity field; and an indicator field. Following extraction of the PM information, the synchronous container can be converted into a SONET/SDH SPE having a conventional size and format.

A recalculated parity value may be calculated in respect of the received data signal. The recalculated parity value can be compared with a received parity value contained in the extracted parity field to obtain an error count. The error count value in respect of the received data signal may be accumulated.

The step of extracting the indicator field may include: monitoring the indicator field of each successive received data signal; and asserting an AIS state if the indicator field of each of a first predetermined number of successive data signals contains a first predetermined value. The AIS state can be de-asserted if the indicator field of each of the first predetermined number of successive data signals contains a value other than the first predetermined value. The first predetermined number of successive data signals may be three, and the first predetermined value may be binary "1111".

The step of extracting an indicator field may include: monitoring the indicator field of each successive received signal; and asserting an RDI state if the indicator field of each of a second predetermined number of successive signals contains a second predetermined value. The predetermined number of successive data signals may be three, and the second predetermined value may be binary "1100".

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and apparatus for ensuring the integrity and validity of multiple layers of open (OP-N) connections mapped through a communications network.

Figure 1:
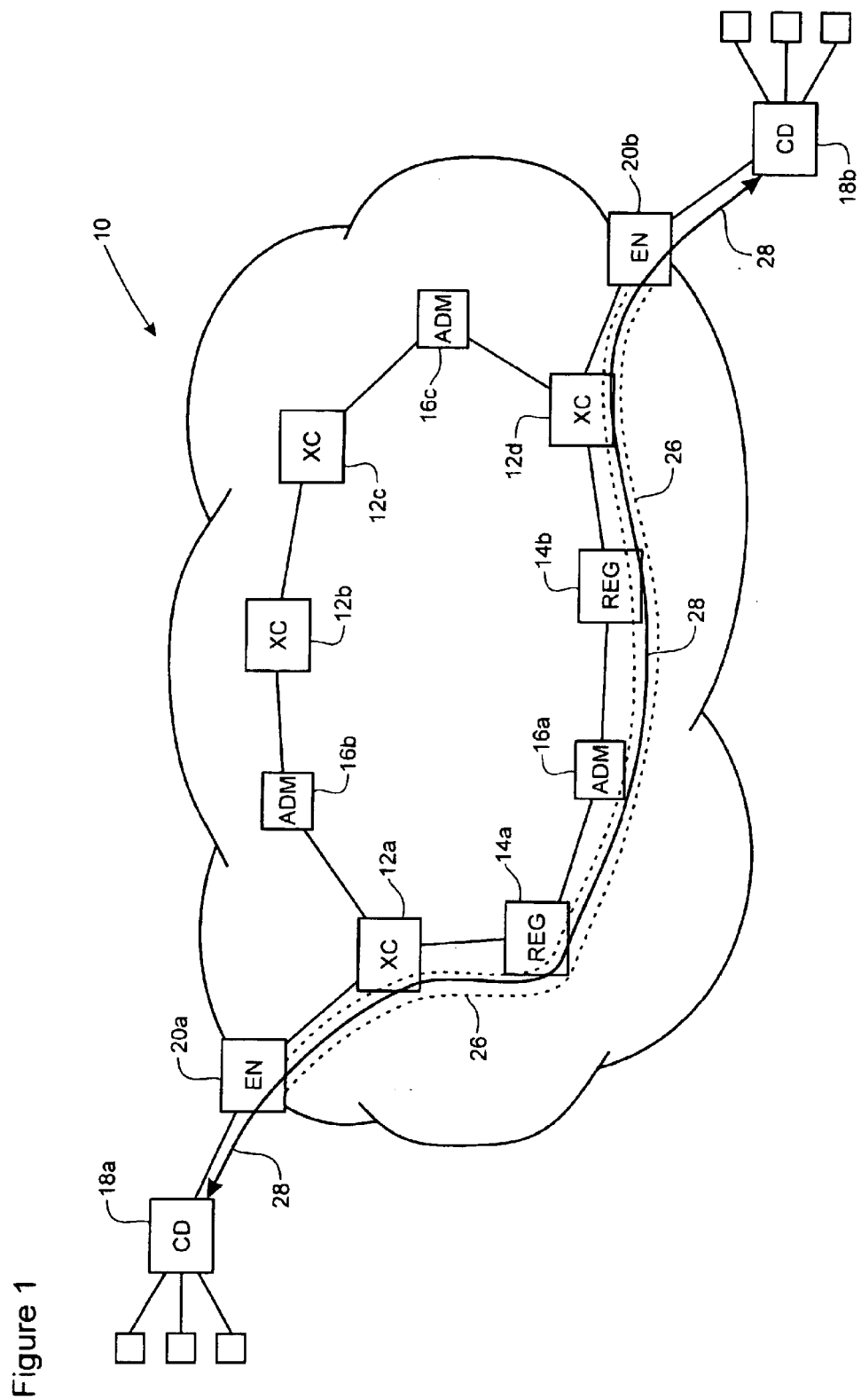
FIG. 1 is a block diagram schematically illustrating a communications network in which an embodiment of the present invention may be implemented.

FIG. 1 is a schematic diagram of a communications network 10 in which the present invention may be implemented. The network 10 includes a plurality of nodes which may be, for example, cross-connects 12*a–d*, regenerators 14*a–b* or Add-Drop-multiplexors (ADMs) 16*a–c*. Communications devices 18*a*,18*b* (e.g. concentrator access switches or service provider routers), may be connected to the network 10 via one or more edge nodes 20*a*,20*b*. Each of the cross-connects 12*a–d*, regenerators 14*a–b*, ADMs 16*a–b*, and edge nodes 20*a–b* are preferably optical nodes configured for wave division multiplex (WDM) and/or dense wave division multiplex (DWDM) transport of data traffic.

As shown in FIG. 1, in order to support arbitrarily concatenated signal traffic between the end-user communications devices 18*a* and 18*b*, an OP-N connection 26 is mapped through the network 10 between the edge nodes 20*a* and 20*b*. The OP-N connection 26 is set up through "OP-N enabled" nodes, and is adapted to transport arbitrarily concatenated signal traffic up to the maximum bandwidth capacity of the OP-N. The OP-N connection 26 is an OP-48 connection (i.e. N=48, see FIG. 2) so that the OP-N connection 26 has a bandwidth capacity equivalent to an optical carrier OC-48 signal. A SONET/SDH path 28 is mapped between end-user communications devices 18*a* and 18*b* through the OP-N connection 26, and utilizes some, or all, of the bandwidth capacity of the OP-N connection 26.

For the purposes of the present invention, an "OP-N enabled" node shall be understood to refer to a network node (of any type) having suitable hardware and software to enable it to participate in an OP-N connection, as described in applicant's above-referenced patent application. An OP-N enabled node is also capable of inserting and processing performance monitor (PM) information in a manner described below in greater detail.

Figure 2:
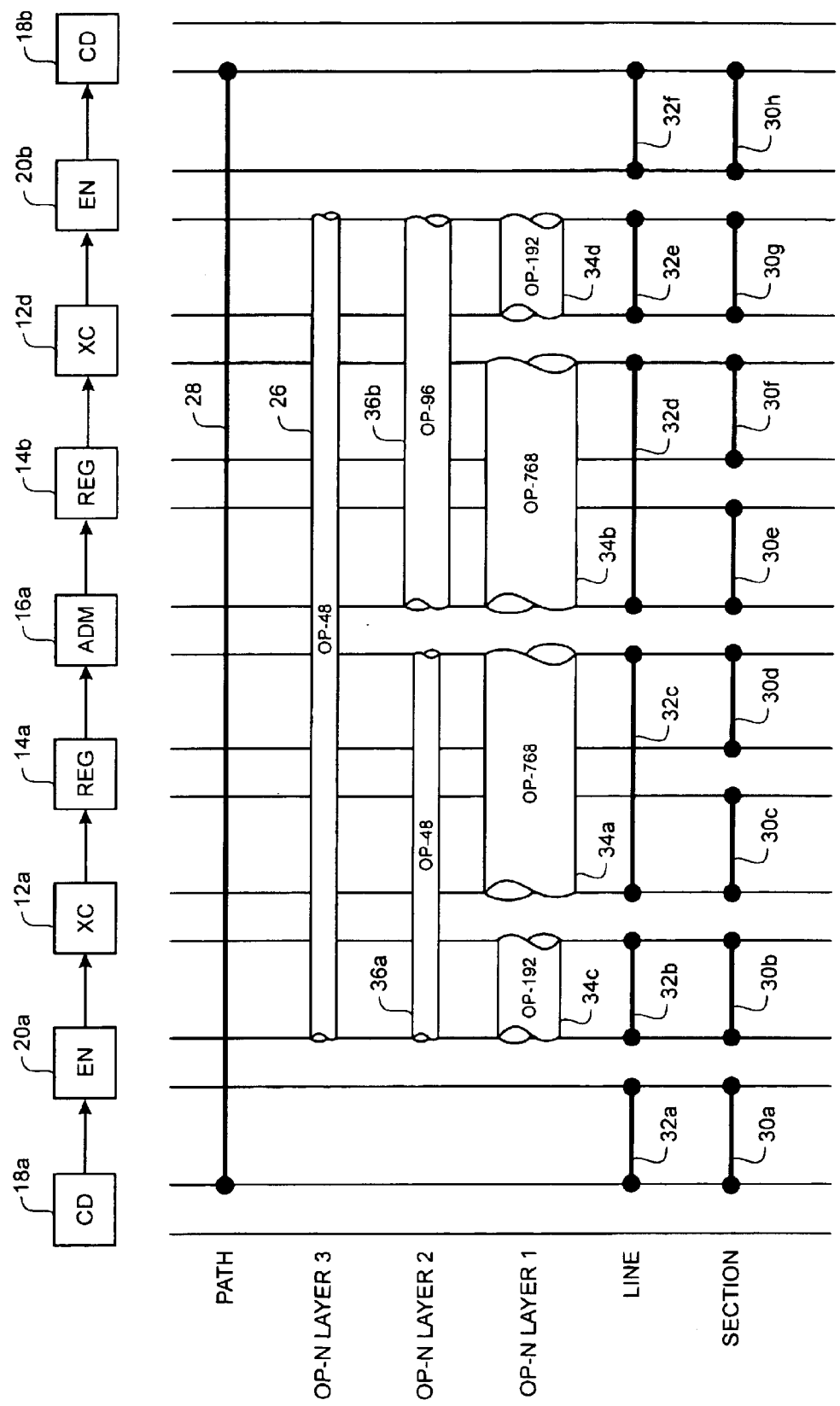
FIG. 2 is a schematic diagram illustrating an exemplary layered architecture of connections mapped through the communications network of FIG. 1.

FIG. 2 is a schematic diagram illustrating the construction of the OP-N connection 26 and the end-to-end SONET/SDH path 28. As shown in FIG. 2, both of these connections are constructed using a layered architecture. The SONET/SDH protocol defines section level connections 30*a–h* which correspond to individual hops in the path 28 between the communications devices 18*a* and 18*b*. Line connections 32*a–f* span one or more sections 30 between network nodes that are capable of processing SONET/SDH line overhead within data signals being transported through the path 28. Both section and line connections 30 and 32 are defined in the SONET/SDH standard. Similarly, the path 28 can be treated as a conventional SONET/SDH path connection because, at least from the point of view of the communications devices 18*a* and 18*b*, the path 28 is indistinguishable from a conventional SONET/SDH path. Thus conventional path level verification and integrity checks may be utilized. However, in the illustrated embodiment the path 28 is mapped through the OP-N connection 26. Accordingly, between the edge nodes 20*a* and 20*b* (defining respective end-points of the OP-N connection 26), transport of data signals through the path 28 will be handled in accordance with the transport functions of the OP-N connection 26 rather than standard SONET/SDH.

As shown in FIG. 2, the OP-N connection 26 is constructed using a layered model. In the illustrated embodiment, this layered model employs three layers of OP-N connections, in which connections of each successive layer span progressively larger distances (in terms of the number of hops) through the network 10. It will be appreciated that the number of layers of connections is arbitrary, so that OP-N connections can be constructed through a network utilizing a layered model having more or fewer layers than illustrated in FIG. 2.

In the example shown in FIG. 2, high bandwidth layer 1 OP-N connections spanning comparatively short distances are mapped between selected nodes within the network. These layer 1 OP-N connections include a first OP-768 34*a* mapped between cross-connect 12*a* and Add-Drop Multiplexor 16*a*; a second OP-768 connection 34*b* mapped between Add-Drop Multiplexor 16*a* and cross-connect 12*d*; and a pair of feeder OP-192 connections 34*c* and 34*d* respectively linking edge nodes 20*a* and 20*b* to cross-connects 12*a* and 12*d*.

The layer 2 OP-N connections include an OP-48 connection 36*a* mapped between the edge node 20*a* and Add-Drop Multiplexor 16*a*, and utilizing a portion of the bandwidth of the layer 1 OP-768 and OP-192 connections 34*a* and 34*c*; and an OP-96 connection 36*b* mapped between the edge node 20*b* and the Add-Drop Multiplexor 16*a* that utilizes a portion of the bandwidth of each of the layer 1 OP-768 and OP-192 connections 34*b* and 34*d*. Finally, the OP-N connection 26 is a layer 3 OP-48 connection mapped between the edge nodes 20*a* and 20*b*. This connection occupies the entire bandwidth of the layer 2 OP-48 connection 36*a*, and a portion of the bandwidth of the layer 2 OP-96 connection 36*b*. In order to ensure reliable data communications using the SONET/SDH path 28 mapped through the OP-N connection 26, the present invention provides a method for validating each of the OP-N connections on each respective layer, independently of one another.

Figure 3:
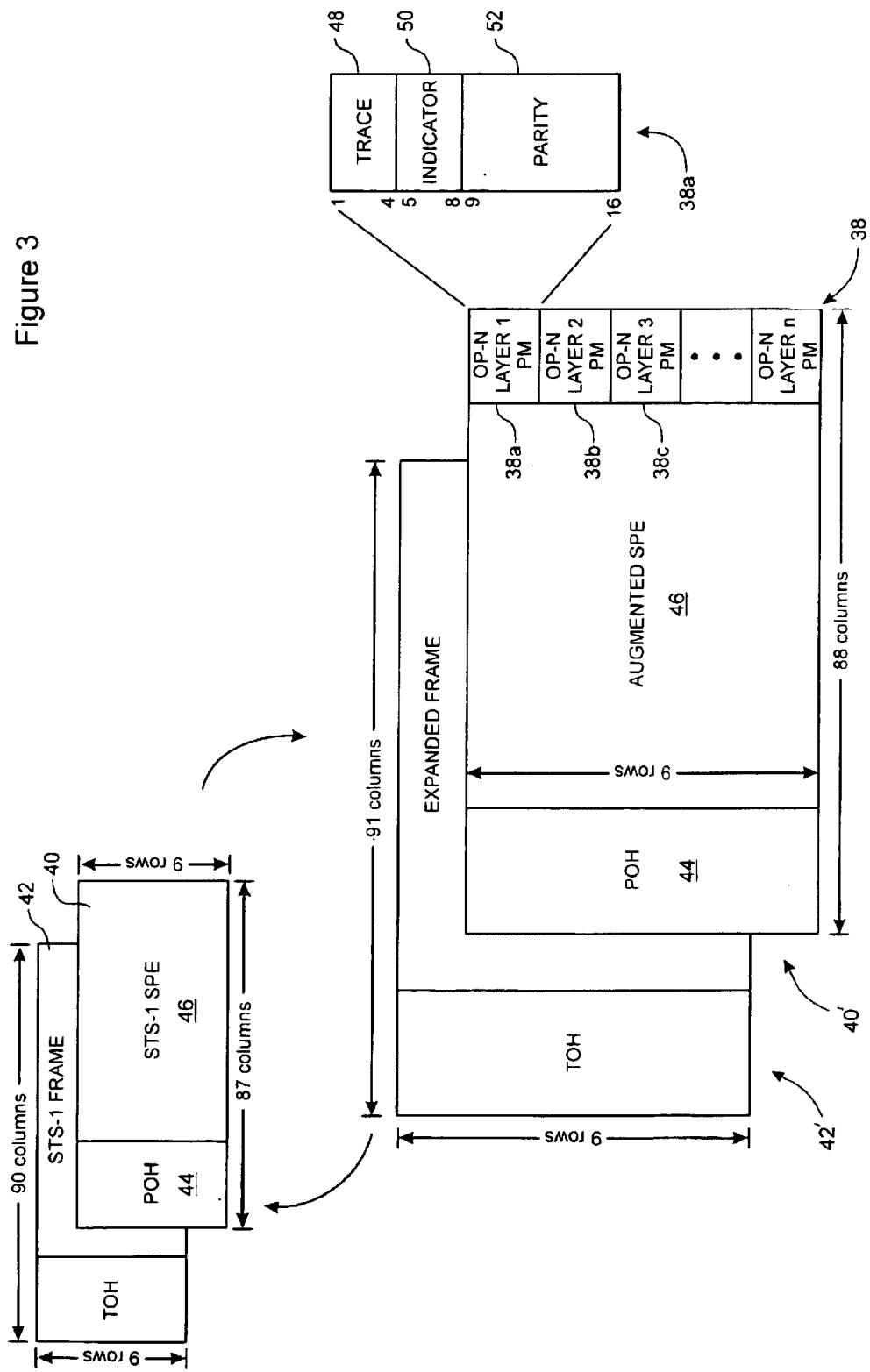
FIG. 3 is a schematic illustration of an exemplary format of connection performance monitor (PM) overhead for each layer of OP-N connections illustrated in FIG. 2.

As shown in FIG. 3, validation of OP-N connections in each layer is accomplished by converting a conventional SONET/SDH SPE 40 into an augmented SPE 40", and inserting performance monitor (PM) information 38 into a predetermined location within the augmented SPE 40". In principle, the predetermined location within the augmented SPE 40' is arbitrary, and therefore can be selected as required for a specific implementation. However the predetermined location is preferably selected so as to minimize interference or overlap with path overhead and payload data contained in the original (i.e. conventional SONET/SDH) SPE 40. Thus, it is preferable to avoid inserting the PM information 38 into the payload overhead (POH) portion 44 of the augmented SPE 40", because the POH 44 is typically fully defined for the payload data within the payload capacity 46 of the original SPE 40. It is therefore generally not possible to assume that any unused space within the POH 44 will be available for carrying the PM information 38. Similarly, it is preferable to avoid interspersing the PM information within the payload data contained in the payload capacity 46, as this would tend to increase the processing required to insert and extract the PM information 38 into and from the SPE. Accordingly, the PM information 38 is preferably appended onto the payload capacity 46, starting after the last byte of payload data, as shown in FIG. 3. Alternatively, the PM information 38 can be prepended to the payload capacity 46, by inserting it between the POH 44 and the payload data.

In order to accommodate the increased size of the augmented SPE 40", the conventional STS frame 42 is replaced by an expanded frame 42', which contains the conventional transport overhead (TOH) and an envelope capacity that has been enlarged to accommodate the augmented SPE 40". Proper pointer processing of the expanded frame 42 and augmented SPE 40" can be accomplished by expanding the range of allowable payload pointer values. In particular, the payload pointer (not shown) within the H2 bytes of each frame 42 is normally provided as a 10-bit binary number, which is capable of accommodating an SPE of up to 1024 bytes. This is significantly larger than the 783 bytes mandated by the SONET/SDH standard. Accordingly, it is possible to define an augmented SPE 40', which is similar to a conventional SPE 40, but has a payload capacity that has been expanded, up to a maximum size of 1024 bytes (per STS-1) to accept the addition of PM information 38. For example, in the embodiment shown in FIG. 2, three layers of OP-N connections are provided. If the PM information 38 associated with each OP-N layer is 8 bytes in length, then an augmented SPE 40" having a payload capacity of 807 bytes, for example, will be able accommodate the PM information 38.

FIG. 3 illustrates the conversion of a conventional STS-1 SPE 40 into an augmented SPE 40" by the addition of a single column, which thereby extends the size of the STS-1 SPE 40 by 9 bytes. It will be appreciated that the present invention is not limited to STS-1 SPE's, but rather may be applied to any required SPE granularity. Thus, for example, an STS-48c SPE 40 could be converted into an augmented STS-48c SPE 40' by the addition of a column, on a per STS-1 basis, to increase the size of the STS-48c SPE 40 by 48×9=432 bytes. Similarly, it will be appreciated that more columns may be added as required, up to a maximum size of 1024 bytes per STS-1.

An augmented SPE 40' can be inserted into a synchronous container (e.g. expanded data frame 42') using conventional means, and transported through an OP-N connection mapped over any transport infrastructure in which the allowable frame length has been increased and pointer processor state machines have been adjusted to accept the increased range of allowable payload pointer values. The conventional 125 $\mu$Sec. frame frequency can be maintained within the OP-N connection by either increasing the line bit-rate, or by adjusting the location of the augmented SPE 40" within the synchronous container to utilize available unused space within the transport overhead (TOH). For example, in the case of a concatenated STS-48c signal, the transport overhead of only the first STS-1 frame is required for routing the signal through the end-to-end path 28. Within each of the second through 48$^{th}$ STS-1 frames of the STS-48c signal, a concatenation indicator is inserted into the TOH to indicate that the respective frame is to be treated in an identical manner to that of the previous STS-1 frame. As a result, much of the TOH within each of the 2$^{nd}$ through 48$^{th}$ frames of an STS-48c signal is redundant, and may therefore be utilized for accommodating an augmented SPE 40', at least while the signal is being conveyed through an OP-N connection.

It will be appreciated that the present invention is not limited to SONET/SDH frames, and may be utilized in conjunction with any synchronous container capable of carrying an augmented SONET/SDH SPE 40' across the network fabric.

Conventional SONET/SDH pointer processing techniques operate to pass the SPE 40 of each frame 42 through the node unchanged. This conventional functionality is preferably maintained with the augmented SPE 40" by enabling pointer processor state machines to accommodate an appropriately increased range of allowable payload pointer values. For example, in the case of three-layers of OP-N connections, and 8 bytes of PM information per OP-N layer, the allowable payload pointer range must be extended from a conventional range of 0–782 to an augmented range of 0–806.

Carrying the PM information within an augmented SPE 40" permits the PM information 38 to pass transparently through intermediate nodes between the end-nodes of an OP-N connection. The frame TOH can therefore be terminated at intermediate nodes in a conventional manner without affecting the PM information 38. If desired, the PM information 38 can be read at one or more intermediate nodes to enable auditing and fault isolation functionality. At the receiving end-point of an OP-N connection, the augmented SPE 40' can be restored to the standard SPE format by stripping the PM information 38 from the augmented SPE 40".

As shown in FIG. 3, PM information, 38$a$–$c$ in this example, associated with each OP-N connection layer is inserted into a respective predetermined location within the augmented SPE 40". Thus for a three-layer OP-N architecture, as illustrated in FIG. 2, three blocks of PM information 38$a$–$c$ are inserted into respective locations within the augmented SPE 40". Each block of PM information 38$a$–$c$ is preferably divided into predetermined fields to facilitate various connection integrity and validation checks. Exemplary fields include an OP-N trace 48, OP-N parity 50 and OP-N indicator 52. The use of each of these fields in validation and integrity checks of each OP-N connection is described below in greater detail, with particular reference to FIG. 4.

Figure 4:
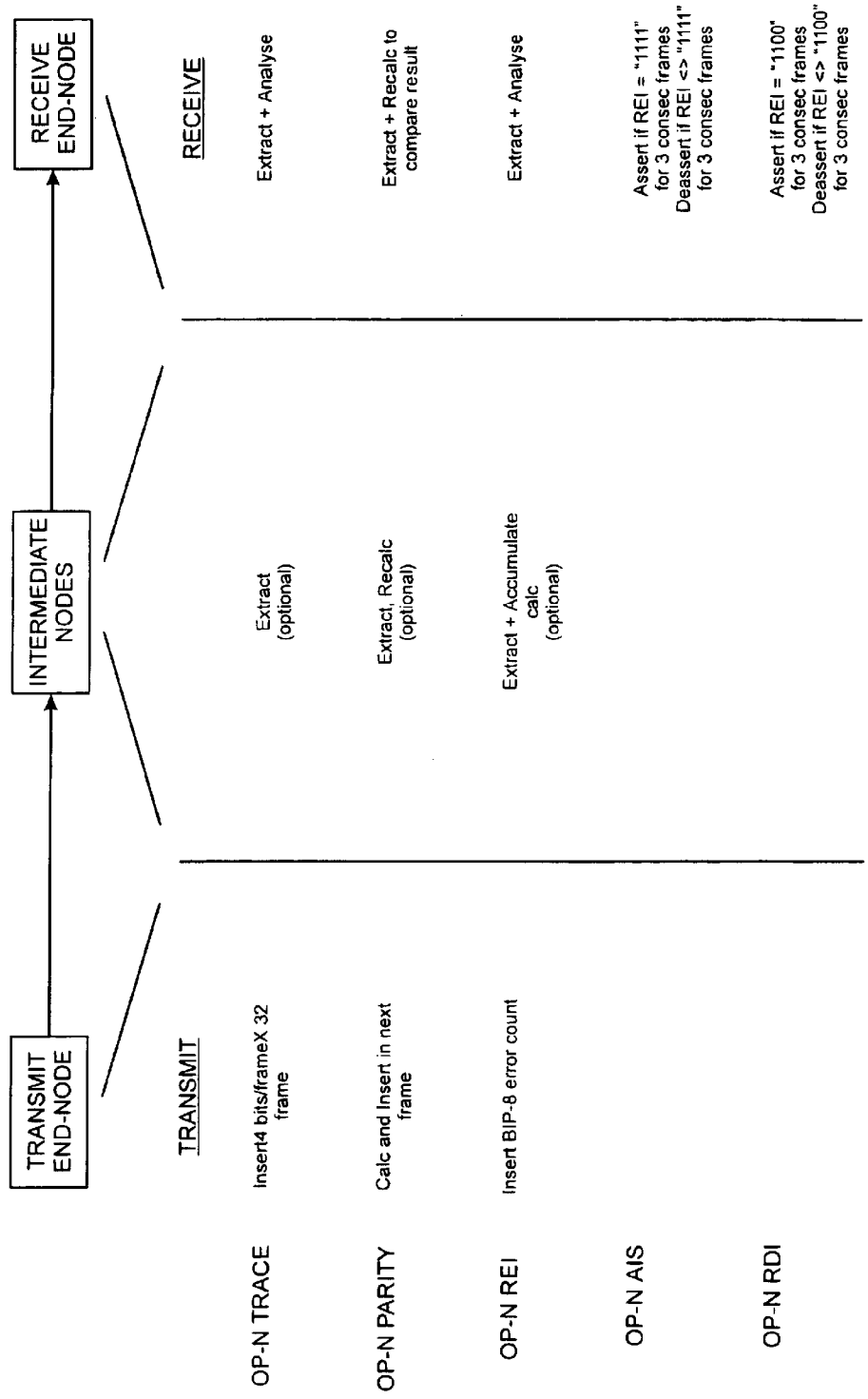
FIG. 4 is a schematic illustration of exemplary operations in a method of validating OP-N connections in accordance with an embodiment of the present invention.

In use, PM information 38 is inserted into an augmented SPE 40" by a node serving as a transmitting end-point of an OP-N connection, and extracted from the augmented SPE 40''' and examined by a node serving as a receiving end-point of the OP-N connection (see FIG. 4). At nodes intermediate the end-points of an OP-N connection, the augmented SPE 40" (including the PM information 38) is pointer processed through the node without change. If desired, the PM information can be read at nodes intermediate the end-points of an OP-N connection to enable auditing and fault isolation.

For example, in the case of a signal being transported through the path 28 between the communications devices 18$a$ and 18$b$, a conventional SPE is received at the end node 20$a$ from the communications device 18$a$. Within the end-node 20$a$, the conventional SPE is converted into an augmented SPE 40" (e.g. by increasing its size by 24 bytes) to accept PM information 38 respecting three layers of OP-N connections. Layer 1, 2 and 3 PM information 38$a$, $b$, $c$ (FIG. 3) in respect of the OP-192 connection 34$c$, OP-48 connection 36$a$ and OP-48 connection 26, respectively, is then prepared and inserted into the augmented SPE 40" by the edge node 20$a$. At the cross-connect 12$a$, the layer 1 PM information 38$a$ is extracted from the signal and examined, while the layer 2 and layer 3 PM information 38$b$ and 38$c$ is pointer processed through the cross-connect 12$a$ within the augmented SPE 40". At the regenerator 14$a$, layer 1, layer 2 and layer 3 PM information 38$a$–$c$ is pointer-processed through the node with the augmented SPE 40". A new layer 1 PM information 38$a$ in respect of the OP-768 connection 34$a$ is then inserted into the augmented SPE 40" by the cross-connect 12$a$ prior to transmitting the signal through the OP-768 connection 34$a$ to the Add-Drop Multiplexor 16$a$. At Add-Drop Multiplexor 16$a$, layer 1 and layer 2 PM information 38$a$,$b$ is extracted and examined, while the layer 3 PM information 38$c$ is pointer processed through the node with the augmented SPE 40'. The Add-Drop Multiplexor 16$a$ then prepares and inserts new layer 1 and layer 2 PM information 38$a$,$b$ respecting the OP-768 connection 34$b$ and the OP-96 36$b$, prior to transmitting the frame. The OP-768 connection 34$b$ includes one intermediate node (regenerator 14$b$). The OP-96 connection 36$b$ includes two intermediate nodes (regenerator 14$b$ and cross-connect 12$d$). At the intermediate node 14$b$ the layer 1, layer 2 and layer 3 PM information 38$a$–$c$ is pointer processed through the node along with the augmented SPE 40'. When the signal arrives at the cross-connect 12*d,* the layer 1 PM information 38*a* respecting the OP-768 connection 34*b* (FIG. 2) is extracted from the signal and examined while the layer 2 and layer 3 PM information 38*b* and 38*c* is pointer processed through the cross-connect 12*d* with the augmented SPE 40'. New layer 1 PM information 38*a* respecting the feeder OP-192 connection 34*d* is prepared within the cross-connect 12*d* and inserted into the signal, prior to launching the signal toward the edge node 20*b,* which extracts and examines the PM information 38*a,* 38*b* and 38*c* to validate each of layer 1 OP-192 connection 34*d,* layer 2 OP-96 connection 36*b,* and layer 3 OP-48 connection 26. Following extraction of the PM information 38*a–c* by the end-node 20*b,* the augmented SPE 40' is converted back into a conventional SONET/SDH SPE 40 for transmission to the receiving communications device 18*b*.

As described above, at a node serving as a transmitting end-node of an OP-N connection (e.g. edge node 20*a* in the example of FIG. 2), PM information 38 (including, for example, OP-N trace, parity and indicator fields) respecting the OP-N connection are prepared and inserted into an augmented SPE 40'. At a node serving as a receiving end-node of the OP-N connection (e.g. end node 20*b* in the example of FIG. 2), the respective PM information 38 is extracted from the augmented SPE 40' and examined to determine the validity and integrity of the OP-N connection. At any pointer processing nodes intermediate the transmitting and receiving end-nodes of the OP-N connection, the PM information 38 is within the augmented SPE 40' without change.

The purpose and function of each of the OP-N trace, parity, and indicator fields 48–52 of the PM information 38 is explained below with reference to FIG. 4. As will be understood by those skilled in the art, an OP-N connection is normally enabled in both directions between the end nodes. However, for the sake of clarity, transmission in only one direction is illustrated.

OP-N Trace

The OP-N trace field 48 of the PM information 38 carries a trace message (having a length of, for example, 16 bytes) carrying connectivity information for a respective OP-N connection. The trace message is preferably divided into smaller parts (e.g. nibbles having a length of, for example, 4 bits), with successive nibbles being included in the PM information 38 inserted into successive augmented SPEs of a data signal. If a 16-byte trace message is divided into 4 bit nibbles, the trace message repeats every 32 SPE's. The format of the trace message can be arbitrary. It is normally defined by a software application that is used to implement the OP-N PM information messaging functionality.

At the transmitting end-node of an OP-N connection, a trace message in respect of the OP-N connection is prepared for insertion into outgoing frames. At the receiving end-node of the OP-N connection, the trace message is extracted from received augmented SPEs 40' and examined to verify the connectivity of the OP-N connection. If the trace message is sent in 4 bit nibbles, each nibble is stored in memory in the receiving node until the entire 16 byte message has been accumulated and reassembled.

OP-N Parity

The OP-N parity field 52 of the PM information 38 provides a parity check between transmit and receive nodes in an OP-N connection. For example, the hardware within each node can process and report OP-N parity on a per-frame or per-signal (e.g. STS-48) basis. If desired, OP-N parity may be used to generate Errored and Severely Errored seconds counts rather than being used to infer precise bit error ratios.

OP-N parity can advantageously be calculated as an 8-bit, Bit Interleaved Parity (BIP-8) value using even parity (so that the parity will be correct during AIS insertion, described below), over a predetermined portion of a data signal. For example, a BIP-8 value can be calculated starting after the H2 byte of TOH covering all STS-N SPE bytes until the next H2 byte. Positive and negative stuff (H3) bytes, as well as the corresponding OP-N trace and OP-N indicator fields 48 and 50, may also be included. The BIP-8 result calculated for an outgoing frame can be inserted into the OP-N parity field 52 of the next frame.

At a transmitting end-node of an OP-N connection, OP-N parity is calculated for outgoing frames (and inserted into the parity field 52 of the augmented SPE 40' contained within the next outgoing frame). At the receiving end-node of the OP-N connection, the OP-N parity information is extracted and simultaneously recalculated as successive frames are received. These extracted and recalculated values can then be compared to assess the integrity of the OP-N connection.

OP-N Indicator Field

The indicator field 50 of the PM information 38 enables fault information to be conveyed to the end-nodes of the OP-N connection. Various fault indications may be provided in respect of each OP-N connection. Exemplary fault indications include Remote Error Indication (REI), Alarm Indication Signaling (AIS), and Remote Defect Indication (RDI). Each of these are described in greater detail below.

OP-N Remote Error Indication (REI)

OP-N Remote Error Indication (REI) provides a capability to signal bit errors to the far-end on a frame-by-frame basis.

In the receive direction, each node can accumulate a valid OP-N error count (e.g. a BIP-8 error count based on received and recalculated parity values, as described above) as successive frames are received. At a node serving as a transmitting end-node of an OP-N connection, the node hardware can insert the OP-N error count accumulated as the frames were received. At the receiving end-node of the OP-N connection, the error count can be accumulated as successive frames are received.

OP-N Alarm Indication Signaling (AIS)

OP-N Alarm Indication Signaling (AIS) is used to signal a failure downstream to the receiving end-node of the OP-N connection. When either Line or Path AIS is asserted (in accordance with conventional SONET/SDH protocol) at any node participating in an OP-N connection, the payload as well as the Transparent Container is set to all 1's.

At each end-node in the OP-N connection, OP-N AIS is asserted if the OP-N REI error count information contains "1111" for 3 consecutively received frames. OP-N AIS is de-asserted if a value, other than "1111", remains unchanged for 3 consecutive frames. When OP-N AIS is asserted (or when otherwise enabled by software), a value of "1100" is inserted into the OP-N indicator field 48 of the PM information of each outgoing frame.

OP-N Remote Defect Indication (RDI)

OP-N Remote Defect Indication (RDI) is used to signal conditions such as OP-N-AIS and Trace mismatch to the far-end of the OP-N. OP-N RDI uses the same set of bits that is used for OP-N REI information.

At each end-node in the OP-N connection, OP-N RDI is asserted if the OP-N REI information contains "1100" for 3 consecutively received frames. OP-N RDI is de-asserted if a value, other than "1100", is received unchanged for 3 consecutive frames.

Figure 5A:
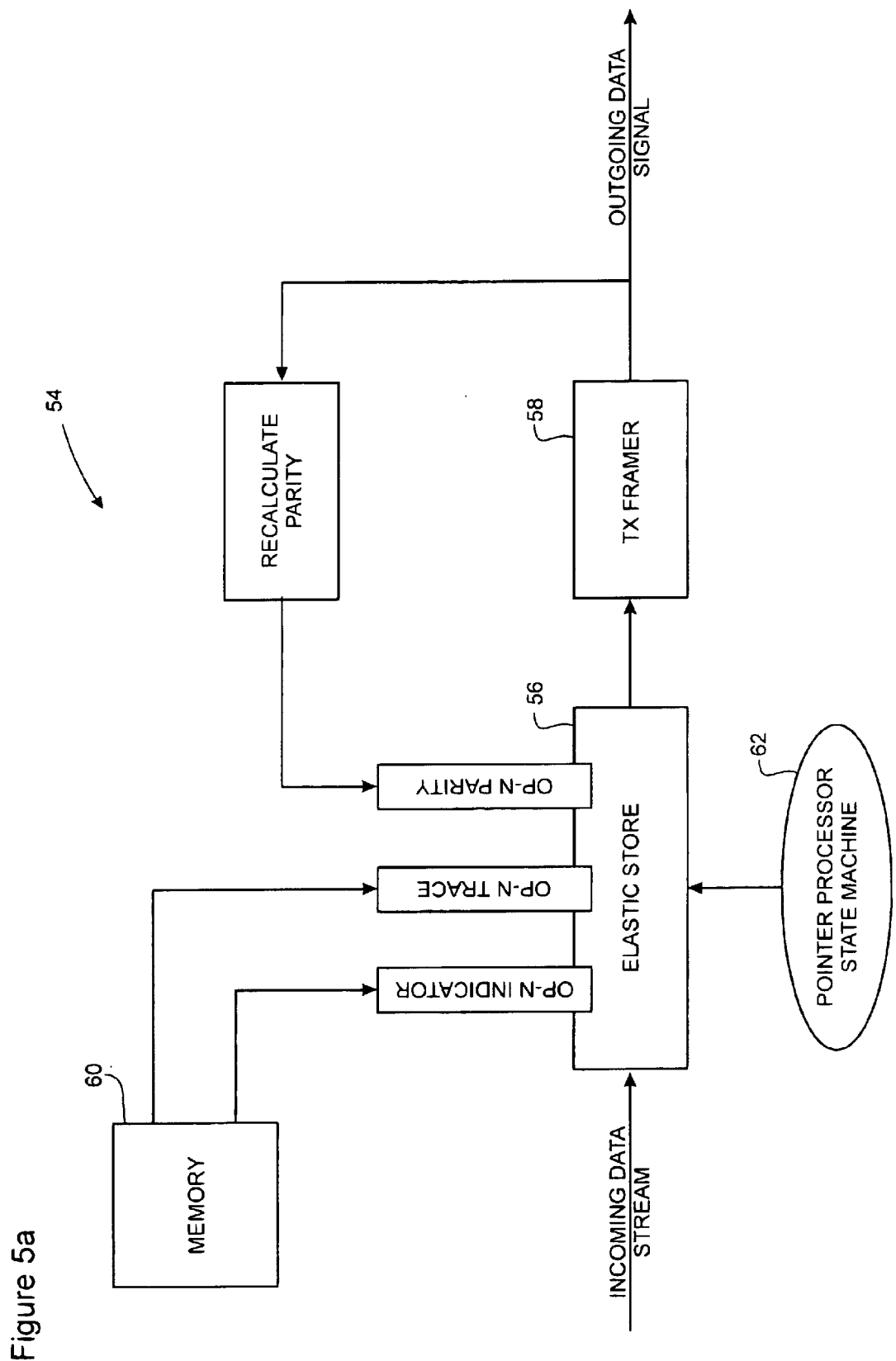
FIGS. 5a and 5b are schematic diagrams respectively illustrating exemplary transmit (Tx) and receive (Rx) processors, in accordance with an embodiment of the present invention.

FIG. 5*a* is a block diagram illustrating an exemplary implementation of an OP-N Transmit (Tx) processor 54 for processing data signals including PM information 38 in accordance with the present invention. The OP-N Tx processor 54 may be implemented (by hardware and software) within each OP-N enabled node of the network 10 capable of serving as a transmitting end-node of an OP-N connection (e.g. edge node 20a in the example of FIG. 2). In general, the Tx processor 54 comprises an elastic store 56; a Tx framer 58; a memory 60; and a pointer-processor state machine 62. The elastic store 56, which may be implemented as a first-in-first-out (FIFO) having an adjustable read pointer (not shown) operates under the control of the pointer processor state machine 62 to map an incoming data stream (which may, for example, be conventional SONET/SDH SPE's) into augmented SPEs 40 containing the OP-N PM information 38. The Tx framer 58 operates to insert the augmented SPEs 40 into outgoing frames of a data signal for transmission through an OP-N connection.

The PM information 38 can be inserted into successive augmented SPEs 40' on the read side of the elastic store 56. In order to insert the PM information 38 into an augmented SPE 40', the application values of the OP-N trace field 48 and OP-N indicator field 50 are read from the memory 60, and inserted into the augmented SPE 40'. For the OP-N parity field 52, an outgoing parity value is calculated in respect of a previous outgoing frame, and the result is inserted into the augmented SPE 40'. This operation results in the calculation of a parity value for each outgoing frame, with the calculated value being inserted in the augmented SPE 40' of the next outgoing frame.

Figure 5B:
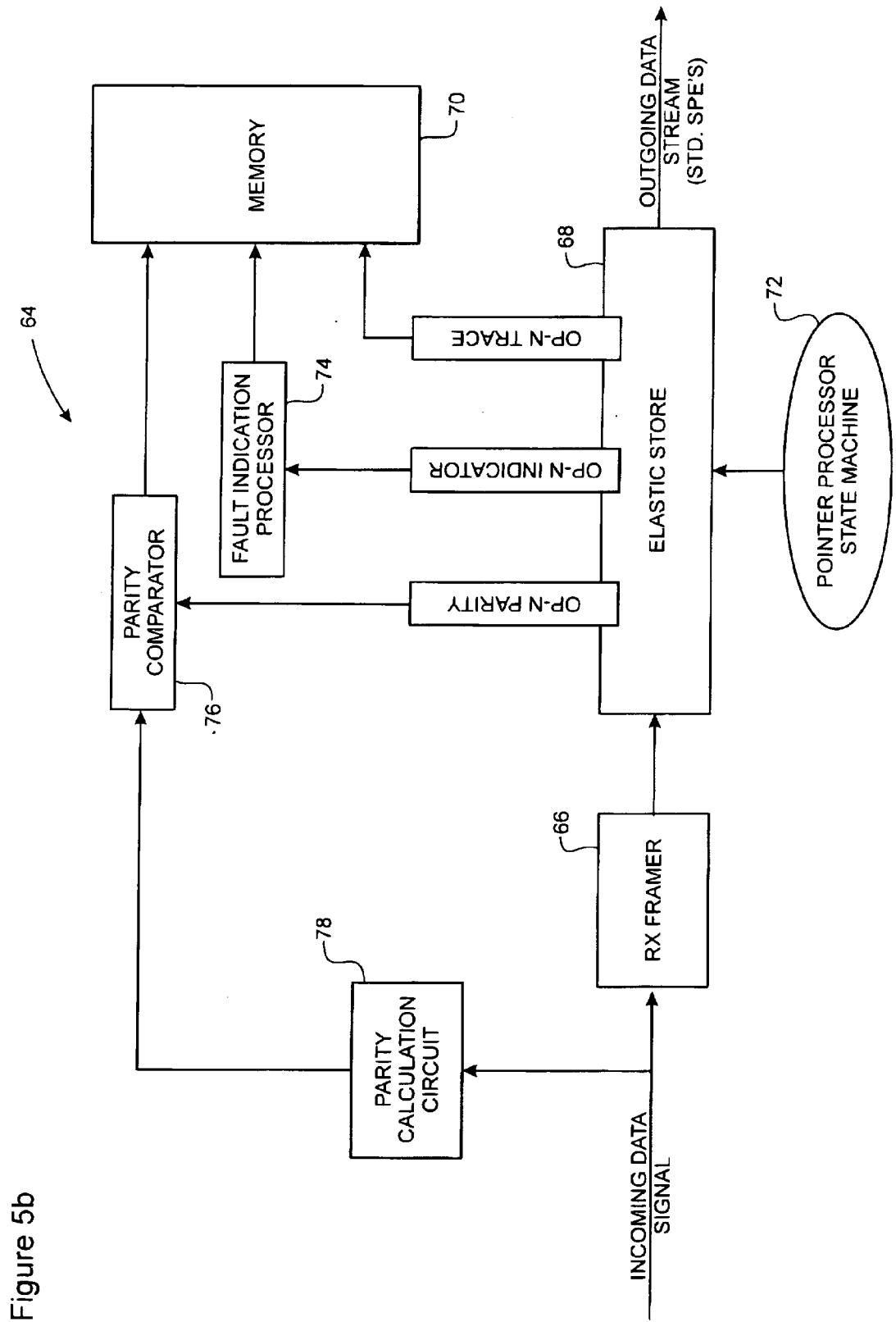

FIG. 5b is a block diagram illustrating an exemplary implementation of a OP-N receive (Rx) processor 64 for processing incoming frames including PM information 38 in accordance with the present invention. The OP-N Rx processor 64 may be implemented (with hardware and software) within each OP-N enabled node of the network 10, and generally comprises an Rx framer 66; an elastic store 68; a memory 70; and a pointer-processor state machine 72. The Rx framer 66 operates to receive successive frames of an incoming data signal, and extracts the frame payload (e.g. the respective augmented SPEs 40'). The augmented SPEs 40' (including the PM information 38) are forwarded to the elastic store 68, which may be implemented as a first-in-first-out (FIFO) having an adjustable read pointer (not shown). Processing of the augmented SPE 40' through the elastic store 68 is controlled by the pointer processor state machine 72. Thus the pointer processor state machine 72 controls the process of reading data from the elastic store 68 such that the PM information 38 is extracted from the augmented SPE 40', which is then restored to the standard SONET/SDH SPE size and format.

The PM information 38 extracted from augmented SPEs 40' is processed as described above with reference to FIG. 4. Thus the contents of the OP-N trace field 48 is saved in the memory 70. The contents of the OP-N indicator field 50 is processed by a fault indication processor 74 (i.e. for OP-N REI, OP-N AIS and OP-N RDI) and saved in the memory 70. An accumulated BIP-8 OP-N REI error count can also be saved in the memory 70. The contents of the OP-N parity field 52 is supplied to an input of a parity comparator 76 as a received parity value. A recalculated parity value, which is determined by a parity calculation circuit 78 on the basis of received frames of the incoming data signal, is supplied to another input of the parity comparator 76. The parity comparator 76 operates to compare the received and recalculated parity values, and saves the comparison result in the memory 70 as an accumulated parity error value.

The "receiver-side" processing of received frames described above is implemented in a receiving end-node of an OP-N connection (e.g. edge node 20b in the illustration of FIG. 2). If desired, this processing can also be implemented in intermediate nodes for auditing and fault isolation purposes. In either case, "receiver-side" processing results in the accumulation of parity and REI error values in the memory 70 to permit evaluation of the integrity and validity of the OP-N connection.

The present invention therefore provides a method and apparatus for validating OP-N connections mapped through a communications network.

The embodiment(s) of the invention described above is(are) intended to be exemplary only. The scope of the invention is therefore intended to be limited solely by the scope of the appended claims.

I claim:

1. A method of validating a connection mapped through a communications network between first and second end-nodes, the method comprising the steps of:
   a) at the first end-node, inserting performance monitor (PM) information into a predetermined location of a payload envelope;
   b) transporting the payload envelope through the connection to the second end-node; and
   c) at the second end-node, extracting the PM information from the predetermined location within the payload envelope, wherein the payload envelope is an augmented synchronous payload envelope (SPE) having a payload capacity that is expanded relative to a standard SONET/SDH frame by an amount sufficient to accommodate the PM information.

2. A method as claimed in claim 1, further comprising a step of enabling the first and second nodes to pointer process the augmented SPE.

3. A method as claimed in claim 2, further comprising a step of providing an extended range of valid payload pointer values that can be pointer processed within a node participating in the connection.

4. A method as claimed in claim 1, wherein each node in the network is adapted to support a plurality of connection layers and the connection is mapped on one of the plurality of connection layers.

5. A method as claimed in claim 4, wherein PM information respecting each layer is inserted into a respective predetermined location of the payload envelope.

6. A method as claimed in claim 1, wherein the step of inserting PM information comprises a step of inserting one or more of a Trace field; a Parity field; and an indicator field.

7. A method as claimed in claim 6, wherein the step of inserting a Trace field comprises inserting a nibble of a trace message for communicating information concerning the connection.

8. A method as claimed in claim 7, wherein the step of inserting the nibble of a trace message comprises a step of inserting successive nibbles of the trace message into respective successive signals until an entire trace message has been sent.

9. A method as claimed in claim 7, wherein the step of inserting a Trace field comprises repeating the trace message after the entire trace message has been sent.

10. A method as claimed in claim 6, wherein the step of inserting a parity field comprises a step of calculating a parity value in respect of a data signal, and inserting the parity value into a next augmented SPE to be transmitted.

11. A method as claimed in claim 10, wherein the parity value is a BIP-8.

12. A method as claimed in claim 11, wherein the parity value is calculated starting after an H2 byte of a transport overhead (TOH) portion of the signal, and incorporates all payload envelope bytes until the H2 byte of a next data signal.

13. A method as claimed in claim 6, wherein the step of inserting an indicator field comprises a step of accumulating an error count in respect of the data signal.

14. A method as claimed in claim 13, wherein the error count is a BIP-8.

15. A method as claimed in claim 1, wherein the step of extracting the PM information comprises a step of extracting one or more of a trace field; a parity field; and an indicator field.

16. A method as claimed in claim 15, further comprising a step of converting the payload envelope into a SONET/SDH SPE having a conventional size and format.

17. A method as claimed in claim 15, wherein the step of extracting a parity field further comprises a step of calculating a parity value in respect of the received data signal.

18. A method as claimed in claim 17, further comprising a step of comparing the recalculated parity value with a received parity value contained in the extracted parity field to obtain an error count.

19. A method as claimed in claim 18, further comprising a step of accumulating the error count value in respect of the received data signal.

20. A method as claimed in claim 15, wherein the step of extracting an indicator field further comprises the steps of:
  a) monitoring the indicator field of each successive received data signal; and
  b) asserting an AIS state if the indicator field of each of a first predetermined number of successive data signals contains a first predetermined value.

21. A method as claimed in claim 20, further comprising a step of de-asserting the AIS state if the indicator field of each of the first predetermined number of successive data signals contains a value other than the first predetermined value.

22. A method as claimed in claim 20, wherein the first predetermined number of successive data signals is three.

23. A method as claimed in claim 20, wherein the first predetermined value is binary "1111".

24. A method as claimed in claim 23, wherein the step of extracting an indicator field further comprises the steps of:
  a) monitoring the indicator field of each successive received signal; and
  b) asserting an RDI state if the indicator field of each of a second predetermined number of successive signals contains a second predetermined value.

25. A method as claimed in claim 24, wherein the predetermined number of successive data signals is three.

26. A method as claimed in claim 24, wherein the second predetermined value is binary "1100".

27. A system of validating a connection mapped through a communications network between first and second end-nodes, the system comprising:
  a) means for inserting performance monitor (PM) information into a predetermined location within a payload envelope at the first end-node;
  b) means for transmitting the payload envelope through the connection to the second end-node; and
  c) means for extracting the PM information from the payload envelope at the second end-node,
wherein the payload envelope is an augmented synchronous payload envelope (SPE) having a payload capacity that is expanded relative to a standard SONET/SDH frame by an amount sufficient to accommodate the PM information.

28. A system as claimed in claim 27, wherein each of the first and second nodes comprise a respective pointer processor state machine adapted to control pointer processing of the augmented SPE.

29. A system as claimed in claim 28, wherein each pointer processor state machine is adapted to accommodate an extended range of valid payload pointer values, relative to that of the SONET/SDH SPE standard.

30. A system as claimed in claim 27, wherein each node in the network is adapted to support a plurality of connection layers and the connection is mapped on one of the plurality of connection layers.

31. A system as claimed in claim 30, wherein PM information respecting each layer is inserted into a respective predetermined location of the payload envelope.

32. A system as claimed in claim 27, wherein the PM information comprises any one or more of a Trace field; a Parity field; and an Indicator field.

33. A system as claimed in claim 32, wherein the Trace field contains a nibble of a trace message for communicating information concerning the connection.

34. A system as claimed in claim 33, wherein successive nibbles of the trace message are inserted into respective successive synchronous containers until an entire trace message has been sent.

35. A system as claimed in claim 33, wherein the trace message is repeated after the entire trace message has been sent.

36. A system as claimed in claim 32, further comprising:
  a) means for calculating a parity value in respect of a data signal; and
  b) means for inserting the parity value into the parity field of a next synchronous container to be transmitted.

37. A system as claimed in claim 36, wherein the parity value is a BIP-8.

38. A system as claimed in claim 37, wherein the parity value is calculated starting after an H2 byte of a transport overhead (TOH) portion of the signal, and incorporates all payload envelope bytes until the H2 byte of a next data signal.

39. A system as claimed in claim 32, wherein the indicator field contains an error count accumulated in respect of the data signal.

40. A system as claimed in claim 39, wherein the error count is a BIP-8.

41. A system as claimed in claim 27, wherein the means for extracting the PM information comprises means for extracting one or more of a trace field; a parity field; and an indicator field.

42. A system as claimed in claim 41, wherein the means for extracting a parity field further comprises means for calculating a parity value in respect of the received data signal.

43. A system as claimed in claim 42, further comprising means for comparing the recalculated parity value with a received parity value contained in the extracted parity field to obtain an error count.

44. A system as claimed in claim 43, further comprising means for accumulating the error count value in respect of the received payload envelope.

45. A system as claimed in claim 41, wherein the means for extracting an indicator field further comprises:
  a) means for monitoring the indicator field of each successive received payload envelope; and
  b) means for asserting an AIS state if the indicator field of each of a first predetermined number of successive payload envelope containers contains a first predetermined value.

46. A system as claimed in claim 45, further comprising means for de-asserting the AIS state if the Indicator field of each of the first predetermined number of successive payload envelopes contains a value other than the first predetermined value.

47. A system as claimed in claim 45, wherein the first predetermined number of successive payload envelope is three.

48. A system as claimed in claim 45, wherein the first predetermined value is binary "1111".

49. A system as claimed in claim 41, wherein the means for extracting an indicator field further comprises:
   a) means for monitoring the indicator field of each successive received payload envelope; and
   b) means for asserting an RDI state if the indicator field of each of a second predetermined number of successive signals contains a second predetermined value.

50. A system as claimed in claim 49, wherein the predetermined number of successive payload envelopes is three.

51. A system as claimed in claim 49, wherein the second predetermined value is binary "1100".

52. An apparatus for validating a connection mapped through a communications network between first and second end-nodes, the apparatus comprising:
   a) means for inserting performance monitor (PM) information into a predetermined location of a payload envelope; and
   b) means for transmitting the payload envelope through the connection,
wherein the payload envelope is an augmented synchronous payload envelope (SPE) having a payload capacity that is expanded relative to a standard SONET/SDH frame by an amount sufficient to accommodate the PM information.

53. An apparatus as claimed in claim 52, wherein each of the first and second nodes comprise a respective pointer processor state machine adapted to control pointer processing of the augmented SPE.

54. An apparatus as claimed in claim 53, wherein each pointer processor state machine is adapted to accommodate an extended range of valid payload pointer values, relative to that of the SONET/SDH SPE standard.

55. An apparatus as claimed in claim 52, wherein each node in the network is adapted to support a plurality of connection layers and the connection is mapped on one of the plurality of connection layers.

56. An apparatus as claimed in claim 55, wherein PM information respecting each layer is inserted into a respective predetermined location of the payload envelope.

57. An apparatus as claimed in claim 52, wherein the PM information comprises any one or more of a Trace field; a Parity field; and an Indicator field.

58. An apparatus as claimed in claim 57, wherein the Trace field contains a nibble of a trace message for communicating information concerning the connection.

59. An apparatus as claimed in claim 58, wherein successive nibbles of the trace message are inserted into respective successive payload envelopes until an entire trace message has been sent.

60. An apparatus as claimed in claim 58, wherein the trace message is repeated after the entire trace message has been sent.

61. An apparatus as claimed in claim 60, further comprising:
   a) means for calculating a parity value in respect of a data signal; and
   b) means for inserting the parity value into the Parity field of a next payload envelope to be transmitted.

62. An apparatus as claimed in claim 61, wherein the parity value is a BIP-8.

63. An apparatus as claimed in claim 61, wherein the parity value is calculated starting after an H2 byte of a transport overhead (TOH) portion of the signal, and incorporates all payload envelope bytes until the H2 byte of a next data signal.

64. An apparatus as claimed in claim 57, wherein the indicator field contains an error count accumulated in respect of the data signal.

65. An apparatus as claimed in claim 64, wherein the error count is a BIP-8.

66. An apparatus for validating a connection mapped through a communications network between first and second end-nodes, the apparatus comprising:
   a) means for receiving a payload envelope through the connection; and
   b) means for extracting performance monitor (PM) information from a predetermined location of an augmented synchronous payload envelope having a payload capacity that is expanded relative to a standard SONET/SDH frame by an amount sufficient to accommodate the PM information.

67. An apparatus as claimed in claim 66, wherein the means for extracting PM information comprises means for extracting one or more of a trace field; a parity field; and an indicator field.

68. An apparatus as claimed in claim 67, wherein the means for extracting a Parity field further comprises means for calculating a parity value in respect of the received payload envelope.

69. An apparatus as claimed in claim 68, further comprising means for comparing the recalculated parity value with a received parity value contained in the extracted Parity field to obtain an error count.

70. An apparatus as claimed in claim 69, further comprising means for accumulating the error count value in respect of the received payload envelope.

71. An apparatus as claimed in claim 67, wherein the means for extracting an indicator field further comprises:
   a) means for monitoring the Indicator field of each successive received synchronous container; and
   b) means for asserting an AIS state if the Indicator field of each of a first predetermined number of successive payload envelope containers contains a first predetermined value.

72. An apparatus as claimed in claim 71, further comprising means for de-asserting the AIS state if the indicator field of each of the first predetermined number of successive payload envelopes contains a value other than the first predetermined value.

73. An apparatus as claimed in claim 71, wherein the first predetermined number of successive payload envelopes is three.

74. An apparatus as claimed in claim 71, wherein the first predetermined value is binary "1111".

75. An apparatus as claimed in claim 67, wherein the means for extracting an indicator field further comprises:
   a) means for monitoring the indicator field of each successive received payload envelope; and
   b) means for asserting an RDI state if the indicator field of each of a second predetermined number of successive signals contains a second predetermined value.

76. An apparatus as claimed in claim 75, wherein the predetermined number of successive payload envelopes is three.

77. An apparatus as claimed in claim 75, wherein the second predetermined value is binary "1100".

78. The method as claimed in claim 1 wherein the augmented synchronous payload envelope has at least one additional column of payload for accommodating the PM information.

79. The system as claimed in claim 27 wherein the augmented synchronous payload envelope has at least one additional column of payload for accommodating the PM information.

80. The apparatus as claimed in claim 52 wherein the augmented synchronous payload envelope has at least one additional column of payload for accommodating the PM information.

81. The apparatus as claimed in claim 66 wherein the augmented synchronous payload envelope has at least one additional column of payload for accommodating the PM information.

* * * * *